United States Patent
Kim

(10) Patent No.: US 8,937,665 B2
(45) Date of Patent: Jan. 20, 2015

(54) OIS (OPTICAL IMAGE STABILIZER) ACTUATOR AND CAMERA MODULE HAVING THE SAME OIS ACTUATOR

(75) Inventor: Hohwan Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/992,533

(22) PCT Filed: Nov. 16, 2011

(86) PCT No.: PCT/KR2011/008743
§ 371 (c)(1),
(2), (4) Date: Jun. 7, 2013

(87) PCT Pub. No.: WO2012/081839
PCT Pub. Date: Jun. 21, 2012

(65) Prior Publication Data
US 2013/0258123 A1    Oct. 3, 2013

(30) Foreign Application Priority Data
Dec. 13, 2010  (KR) .......................... 10-2010-0127052

(51) Int. Cl.
*H04N 5/228* (2006.01)
*G02B 27/64* (2006.01)
*G03B 5/04* (2006.01)
*H04N 5/232* (2006.01)
*G03B 5/02* (2006.01)

(52) U.S. Cl.
CPC ............ *H04N 5/23287* (2013.01); *G03B 5/04* (2013.01); *G02B 27/646* (2013.01); *G03B 5/02* (2013.01)
USPC .................... 348/208.11; 359/554; 348/208.4

(58) Field of Classification Search
USPC ................. 348/208.11, 208.4, 208.7, 208.99
See application file for complete search history.

(56) References Cited

U.S. PATENT DOCUMENTS

| 8,041,201 | B2* | 10/2011 | Eromaki et al. ................ 396/55 |
| 2006/0092514 | A1 | 5/2006 | Koo et al. ..................... 359/557 |
| 2007/0103555 | A1* | 5/2007 | Eromaki .................... 348/208.4 |
| 2007/0182824 | A1* | 8/2007 | Nomura et al. .......... 348/208.99 |
| 2009/0002825 | A1 | 1/2009 | Morita et al. ................. 359/554 |
| 2009/0213236 | A1 | 8/2009 | Chiou et al. ............ 348/208.11 |
| 2009/0309982 | A1* | 12/2009 | Rouvinen et al. .......... 348/208.2 |
| 2010/0118402 | A1* | 5/2010 | Washisu ....................... 359/557 |
| 2012/0120308 | A1* | 5/2012 | Gutierrez et al. ............. 348/374 |
| 2013/0021685 | A1* | 1/2013 | Fan et al. ..................... 359/824 |
| 2014/0028887 | A1* | 1/2014 | Azuma .................... 348/333.01 |

FOREIGN PATENT DOCUMENTS

WO   WO 2008/061025 A1   5/2008

OTHER PUBLICATIONS

International Search Report dated May 22, 2012 issued in Application No. PCT.KR2011/00743.

* cited by examiner

*Primary Examiner* — Sinh Tran
*Assistant Examiner* — Shahbaz Nazrul
(74) *Attorney, Agent, or Firm* — Ked & Associates, LLP

(57) ABSTRACT

The present invention relates to an OIS (Optical Image Stabilizer) actuator and a camera module having the OIS actuator, the OIS actuator including: a horizontal driving unit; a vertical driving unit; and a support unit positioned at a periphery of the vertical driving unit and formed with a fourth electrode, wherein any one of the horizontal driving unit and the vertical driving unit is driven to compensate a warping of an optical path of an OIS lens unit.

20 Claims, 1 Drawing Sheet

OIS (OPTICAL IMAGE STABILIZER) ACTUATOR AND CAMERA MODULE HAVING THE SAME OIS ACTUATOR

CROSS-REFERENCE TO RELATED PATENT APPLICATIONS

This application is a U.S National Stage Application under 35 U.S.C. §371 of PCT Application No. PCT/KR2011/008743, filed Nov. 16, 2011,which claims priority under 35 U.S.C. §119 to Korean Application No. 10-2010-0127052, filed Dec. 13, 2010.

TECHNICAL FIELD

Teachings in accordance with the exemplary embodiments of this invention relate generally to an OIS (Optical Image Stabilizer) of a camera, and more particularly to a capacitive type OIS actuator and a camera module having an OIS actuator.

BACKGROUND ART

Recently, as demands on a high quality image of a small camera used for mobile phones and mobile devices are on the increase, demands are also on the increase on adoption of an OIS (Optical Image Stabilizer) on DSC (Digital Still Camera) to prevent damaged image caused by hand-tremor during photographing of long exposure time.

However, the conventional VCM (Voice Coil Motor) type, piezo type or step motor type OIS devices are disadvantageous in being adopted for small-sized mobile devices due to a relatively large size, difficulty in mounting to small sized mobile devices, large power consumption during OIS driving and restriction in battery charged time.

Therefore, needs have surfaced for optical hand-tremor (hand-shake) prevention devices and camera module mounted therewith that have no problems in size and power consumption and that can cope with desires by device users for capturing a high quality image.

DISCLOSURE OF INVENTION

Technical Problem

In order to resolve the above-mentioned problems and/or disadvantages, the present invention is disclosed to provide a capacitive type OIS actuator configured to compensate a warp (or warping) of an optical path caused by hand tremor of camera module, to be adequate to miniaturization and to save power consumption, and a camera module having the OIS actuator.

Technical problems to be solved by the present invention are not restricted to the above-mentioned, and any other technical problems not mentioned so far will be clearly appreciated from the following description by skilled in the art.

Solution to Problem

An object of the invention is to solve at least one or more of the above problems and/or disadvantages in whole or in part and to provide at least the advantages described hereinafter. In order to achieve at least the above objects, in whole or in part, and in accordance with the purposes of the invention, as embodied and broadly described, and in one general aspect of the present invention, there is provided an OIS actuator, the OIS actuator comprising: a horizontal driving unit connected by wrapping an edge of an OIS lens unit positioned on an optical path, having a first combteeth-shaped first electrode at one side and a first elastic unit at the other side, and driven to a horizontal direction perpendicular to an optical axis of the OIS lens unit based on electrostatic force acting on the first electrode and elasticity force acting on the first elastic unit; a vertical driving unit positioned at a periphery of the horizontal driving unit, having a second electrode discretely meshed with the first combteeth-shaped first electrode, a second combteeth-shaped third electrode at one side perpendicular to the optical axis and the horizontal direction and a second elastic unit on the other side, and driven to a horizontal direction based on electrostatic force acting on the third electrode and elasticity force acting on the second elastic unit; and a support unit positioned at a periphery of the vertical driving unit and having a fourth electrode discretely meshed with the second combteeth-shaped third electrode, wherein a warpage of an optical path of the OIS lens unit is compensated by driving of at least any one of the horizontal driving unit and the vertical driving unit.

Preferably, the first and second elastic units are respectively bias springs.

Preferably, the first elastic unit is supportively connected to the vertical driving unit.

Preferably, the second elastic unit is supportively connected to the support unit.

Preferably, the support unit further includes at least one terminal unit electrically connected to the first, second, third and fourth electrodes.

Preferably, the OIS actuator is further comprising an OIS driving unit connected to the terminal unit.

Preferably, the OIS lens unit includes at least one lens.

In another general aspect of the present invention, there is provided a camera module having an OIS actuator, the camera module comprising: an image sensor imaged by light; an OIS actuator including an OIS lens unit positioned at a front surface of the image sensor to allow light to penetrate therethrough, a horizontal driving unit connected by wrapping an edge of the OIS lens unit to drive to a horizontal direction, a vertical driving unit positioned at an edge of the horizontal driving unit to vertically drive relative to an optical axis of the OIS lens unit and the horizontal direction respectively, and a support unit positioned at a periphery of the vertical driving unit; an angular velocity detection unit detecting an angular velocity corresponding to a warpage of an optical path of the OIS lens unit; and an OIS driving unit transmitting a driving signal to the OIS actuator in response to the detected angular velocity, wherein the horizontal driving unit includes: a first combteeth-shaped first electrode at one side and a first elastic unit at the other side, and driven to a horizontal direction perpendicular to an optical axis of the OIS lens unit based on electrostatic force acting on the first electrode and elasticity force acting on the first elastic unit; a vertical driving unit having a second electrode discretely meshed with the first combteeth-shaped first electrode, a second combteeth-shaped third electrode at one side perpendicular to the optical axis and the horizontal direction and a second elastic unit on the other side, and driven to a horizontal direction based on electrostatic force acting on the third electrode and elasticity force acting on the second elastic unit; and a support unit having a fourth electrode discretely meshed with the second combteeth-shaped third electrode.

Preferably, the image sensor is a CCD (Charge Coupled Device) sensor or a CMOS (Complementary Metal Oxide Semiconductor) sensor.

Preferably, the angular velocity detecting unit is a gyro sensor.

Preferably, the first and second elastic units are bias springs respectively.

Preferably, the first elastic unit is supportively connected to the vertical driving unit.

Preferably, the second elastic unit is supportively connected to the support unit.

Preferably, the support unit further includes at least one terminal unit electrically connected to the first, second, third and fourth electrodes.

Preferably, the OIS driving unit is connected to the terminal unit.

Preferably, the OIS lens unit includes at least one lens.

Preferably, the camera module is further comprising an auto-focusing actuator positioned at a front surface or a back surface of the OIS actuator for being driven for automatic focus adjustment.

Preferably, the camera module is further comprising a focus adjusting driving unit for transmitting a driving signal to the auto-focusing actuator for adjusting a focal length from the image sensor.

Preferably, the auto-focusing actuator includes a capacitive type MEMS (Micro Electro Mechanical System) actuator for miniaturizing the camera module.

Preferably, the camera module is further comprising a sub lens barrel embedded with at least one lens between the image sensor and the OIS actuator.

Advantageous Effects of Invention

Teachings in accordance with the exemplary embodiments of this invention have an advantageous effect in that warp of an optical path caused by hand tremor on a camera module can be compensated to be conducive to miniaturization of the camera module and to low power consumption in driving the camera module.

Teachings in accordance with the exemplary embodiments of this invention have another advantageous effect in that horizontal/vertical driving is enabled by adjustment of electrostatic capacity to compensate the warp of the optical path by covering a droop phenomenon of a camera module caused by gravity.

Various aspects and embodiments of the invention are described in further detail below.

The technical solution is neither intended nor should it be construed as being representative of the full extent and scope of the present invention, which these and additional aspects will become more readily apparent from the detailed description, particularly when taken together with the appended drawings. As mentioned above, the technical solution is not an extensive overview and is not intended to identify key or critical elements of the apparatuses, methods, systems, processes, and the like, or to delineate the scope of such elements. The technical solution provides a conceptual introduction in a simplified form as a prelude to the more-detailed description that follows.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
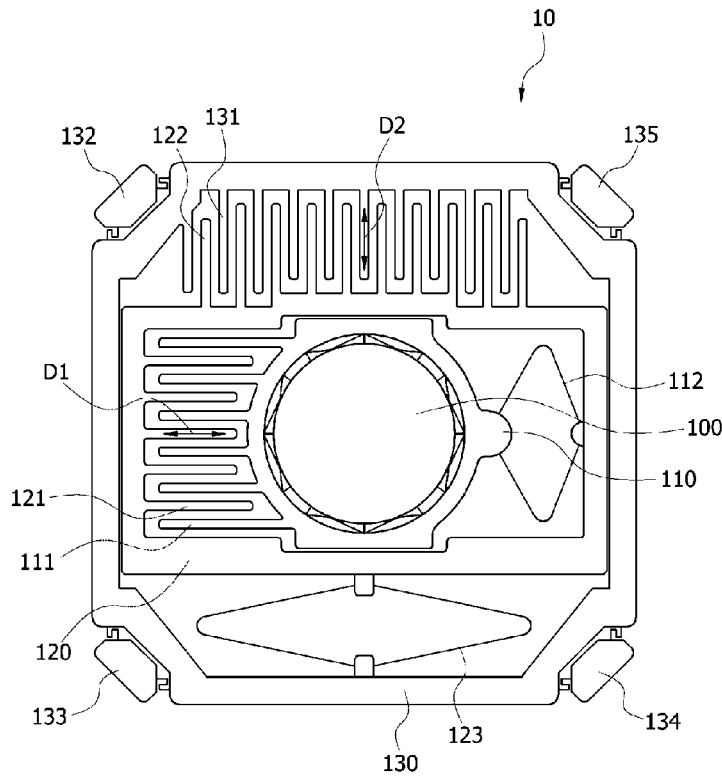
FIG. 1 is a front view of an OIS actuator according to an exemplary embodiment of the present invention.
Figure 2:
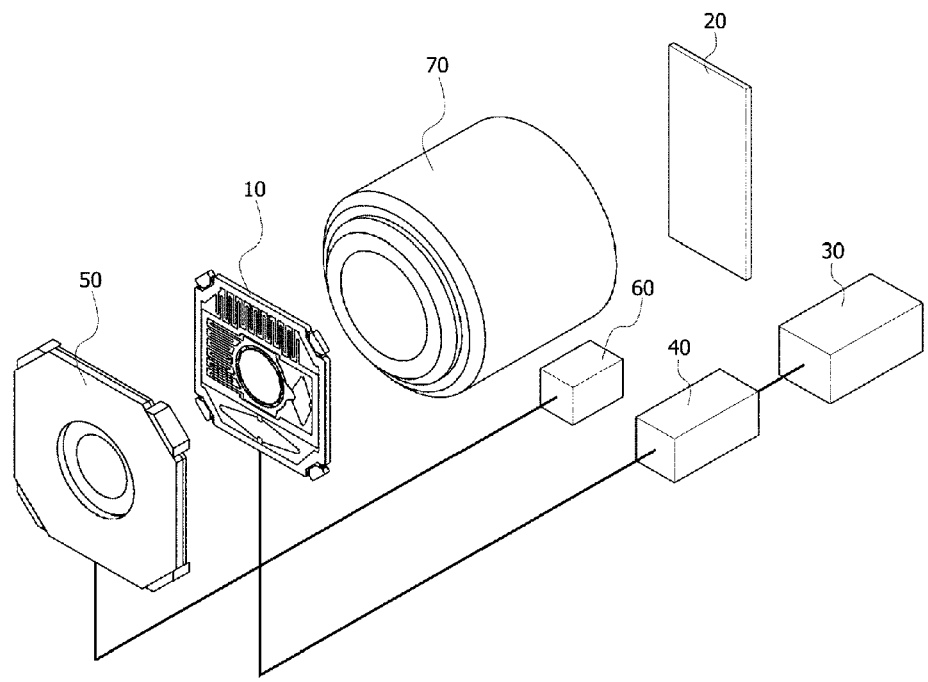
FIG. 2 is an exploded perspective view of a camera module having an OIS actuator according to an exemplary embodiment of the present invention.

The disclosed embodiments and advantages thereof are best understood by referring to FIGS. 1-2 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes", "including","have" and/or "having" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Words such as "thereafter," "then," "next," etc. are not intended to limit the order of the processes; these words are simply used to guide the reader through the description of the methods.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

Now, a capacitive type OIS actuator and a camera module having the OIS actuator according to an exemplary embodiment of the present invention will be described in detail with reference to the accompanying drawings.

<OIS actuator>

FIG. 1 is a front view of an OIS actuator according to an exemplary embodiment of the present invention.

Referring to FIG. 1, the OIS actuator (10) according to the exemplary embodiment of the present invention includes a lens unit (100), a horizontal driving unit (110), a vertical driving unit (120) and a support unit (130).

The OIS actuator according to the exemplary embodiment of the present invention, being mounted to a camera module, serves to compensate a warp of an optical path of the lens unit (100) through at least one of a horizontal driving (D1) and a vertical driving (D2) of the horizontal driving unit (110) and the vertical driving unit (120) based on detection of angular velocity of a separate gyro sensor (not shown) in response to the warp of the optical path of the lens unit (100) caused by hand tremor.

Now, configuration of the OIS actuator according to the exemplary embodiment of the present invention will be described with reference to FIG. 1.

The horizontal driving unit (110) may be connected by wrapping an edge of an OIS lens unit positioned on an optical path and may include a first combteeth-shaped first electrode at one side and a first elastic unit at the other side.

A plurality of lenses (not shown) forming the camera module constitutes a lens array, where the OIS lens unit (100) may be one of the plurality of lenses, and moved along with the horizontal driving unit (110) by hand tremor by being relatively fixed to the horizontal driving unit (110). That is, the OIS lens unit (100) includes at least one lens.

The horizontal driving unit (110) is driven to a horizontal direction perpendicular to an optical axis of the OIS lens unit based on electrostatic force acting on the first electrode (111) and elasticity force acting on the first elastic unit (112).

That is, the combteeth-shaped first electrode (111) is horizontally driven by being acted on by an electrostatic force based on electrostatic capacity of a second electrode (described later), and alternatively, the first elastic unit (112) is horizontally driven by being acted on elasticity force (or stress) based on electrostatic capacity.

The horizontal driving unit (110) adjusts the electrostatic capacity between the first electrode (111) and the second electrode (121) to adjust the electrostatic force and the elasticity force, whereby a warp of the lens unit (100) connected to the horizontal driving unit (110) is compensated by adjusting the horizontal position.

The vertical driving unit (120) may be positioned at a periphery of the vertical driving unit (110), and may include a second electrode (121) discretely meshed with the first combteeth-shaped first electrode, a second combteeth-shaped third electrode (122) at one side perpendicular to the optical axis and the horizontal direction and a second elastic unit (123) on the other side.

The vertical driving unit (120) serves to be driven to a horizontal direction based on electrostatic force acting on the third electrode (122) and elasticity force acting on the second elastic unit (123).

That is, the vertical driving unit (120), like the horizontal driving unit (110), also adjusts the electrostatic force by adjusting the electrostatic capacity between the third electrode (122) and a fourth electrode (131, described later), and elasticity force (or stress) is adjusted based on strain according to electrostatic force of the second elastic unit (123), whereby a warp of the lens unit (100) to the vertical direction is compensated by adjusting the vertical position.

The first elastic unit (112) is interposed between the horizontal driving unit (110) and the vertical driving unit (120) to transmit a mutual elasticity force, and serves as a conductive wire for adjusting an electrostatic capacity between the first electrode (111) and the second electrode (121). The first elastic unit (112) may be formed by a bias spring, and may be variably formed as long as elasticity force (or stress) can be generated based on strain.

The support unit (130) is positioned at a periphery of the vertical driving unit (120) and includes a fourth electrode (131) discretely meshed with the second combteeth-shaped third electrode (122). The fourth electrode (131), as mentioned before, is discretely meshed with the second combteeth-shaped third electrode (122) of the vertical driving unit (120) to have an electrostatic capacity, where the second elastic unit (123) is interposed between the vertical driving unit (120) and the support unit (130) to transmit an elasticity force to each other, and serves as a conductive wire for adjusting an electrostatic capacity between the third electrode (122) and the fourth electrode (131). The second elastic unit (123), as in the first elastic unit (112), may be formed by a bias spring, and may be variably formed as long as elasticity force (or stress) can be generated based on strain.

The support unit (130) may further include at least one terminal unit (132, 133, 134, 135) electrically connected to the first, second, third and fourth electrodes (111, 121, 122, 131). The terminal unit (132, 133, 134, 135) is so formed as to receive a driving signal by being connected to an outside OIS driving unit (40).

The OIS actuator according to the exemplary embodiment of the present invention thus described may be driven by a fine adjustment of electrostatic capacity, such that the OIS actuator can adjust a driving signal to compensate a warp of the optical path and influence by gravity.

Mode for the Invention

<Camera Module having an OIS Actuator>

FIG. 2 is an exploded perspective view of a camera module having an OIS actuator according to an exemplary embodiment of the present invention.

Referring to FIG. 2, the camera module having the OIS actuator according to the exemplary embodiment of the present invention includes an image sensor (20), an OIS actuator (10), an angular velocity detecting unit (30) and an OIS driving unit (40). The camera module having the OIS actuator according to the exemplary embodiment of the present invention may further include an auto-focusing actuator for automatic focus adjustment along with a sub lens barrel (70) and a focus adjusting driving unit (60).

In a case a warp of the camera module is detected through the angular velocity detecting unit (30) for light to reach the image sensor (20) for image formation without warp of the optical path, the OIS actuator (10) having received a driving signal of the OIS driving unit (40) is horizontally or vertically driven to compensate the warp of the optical path.

The auto-focusing actuator (50) serves to adjust a distance from an object (an image pick-up object) for adjusting a focus, where the focus adjusting driving unit (60) a driving signal based on an optimal focal length based on an image formed on the image sensor (20), and the distance is adjusted by receiving, by the auto-focusing actuator (50), the generated driving signal.

Now, configuration of the camera module having an OIS actuator according to the exemplary embodiment of the present invention will be described with reference to FIG. 2, where redundant explanation of the OIS actuator (10) will be omitted.

The image sensor (20) may be formed by a CCD (Charge Coupled Device) sensor or a CMOS (Complementary Metal Oxide Semiconductor) sensor. The image sensor (20) has no choice but to photograph a blurry image, if a lens positioned at a front is influenced by hand tremor to warp an optical path, unless the warp is compensated.

The angular velocity detecting unit (30) functions to detect an angular velocity corresponding to the warp of the optical path at the OIS lens unit (100). Generally, the camera module is rotated with an arbitrary angular velocity based on a shoulder or an armpit of a user when a hand is shaken, where the angular velocity detecting unit (30) detects an angular velocity corresponding to the hand tremor. The angular velocity detecting unit (30) may be a small-sized gyro sensor.

The OIS driving unit (40) serves to transmit a driving signal to the OIS actuator (10) in response to the detected angular velocity. The OIS driving unit (40) divides the angular velocity to a horizontal direction and a vertical direction, and provides a warp-compensating electrostatic capacity to the horizontal driving unit (110) and the vertical driving unit (120) in response to the horizontal direction and the vertical direction.

The sub lens barrel (70) serves as a cylindrical pad that sets a position among inner lenses (not shown) at an adequate distance relationship, and forms a lens array along with the lens unit (100) at the OIS actuator (10), whereby an image having passed the lens array can be formed on the image sensor (20).

That is, the sub lens barrel (70) is interposed between the image sensor (20) and the OIS actuator (10) and includes at least one lens.

The auto-focusing actuator (50) is positioned at a front surface of the camera module and is driven to adjust a distance in relation with an object for auto-focusing adjustment. Particularly, the auto-focusing actuator (50) may be formed with a capacitive type MEMS (Micro Electro Mechanical System) actuator for miniaturizing the camera module.

Furthermore, auto-focusing algorithm is applied to the image formed by the image sensor (20) to realize the auto-focusing adjustment by providing, by the focus adjusting driving unit (60), a driving signal corresponding to a focal length to the auto-focusing actuator (50).

Also, the camera module is further comprising an auto-focusing actuator positioned at a front surface or a back surface of the OIS actuator for being driven for automatic focus adjustment.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

Industrial Applicability

The present invention has an industrial applicability in that warp of an optical path caused by hand tremor on a camera module can be compensated to be conducive to miniaturization of the camera module and to low power consumption in driving the camera module.

The invention claimed is:

1. An OIS (Optical Image Stabilizer) actuator comprising: a horizontal driving unit connected by wrapping an edge of an OIS lens unit positioned on an optical path, having a first combteeth-shaped first electrode at one side and a first elastic unit at the other side, and driven to a horizontal direction perpendicular to an optical axis of the OIS lens unit based on electrostatic force acting on the first electrode and elasticity force acting on the first elastic unit; a vertical driving unit positioned at a periphery of the horizontal driving unit, having a second electrode discretely meshed with the first combteeth-shaped first electrode, a second combteeth-shaped third electrode at one side perpendicular to the optical axis and the horizontal direction and a second elastic unit on the other side, and driven to a horizontal direction based on electrostatic force acting on the third electrode and elasticity force acting on the second elastic unit; and a support unit positioned at a periphery of the vertical driving unit and having a fourth electrode discretely meshed with the second combteeth-shaped third electrode, wherein a warpage of an optical path of the OIS lens unit is compensated by driving of at least any one of the horizontal driving unit and the vertical driving unit.

2. The OIS actuator of claim 1, wherein the first and second elastic units are respectively bias springs.

3. The OIS actuator of claim 1, wherein the first elastic unit is supportively connected to the vertical driving unit.

4. The OIS actuator of claim 1, wherein the second elastic unit is supportively connected to the support unit.

5. The OIS actuator of claim 1, wherein the support unit further includes at least one terminal unit electrically connected to the first, second, third and fourth electrodes.

6. The OIS actuator of claim 5, further comprising an OIS driving unit connected to the terminal unit.

7. The OIS actuator of claim 1, wherein the OIS lens unit includes at least one lens.

8. A camera module having an OIS (Optical Image Stabilizer) actuator, the camera module comprising: an image sensor imaged by light; an OIS actuator including an OIS lens unit positioned at a front surface of the image sensor to allow light to penetrate therethrough, a horizontal driving unit connected by wrapping an edge of the OIS lens unit to drive to a horizontal direction, a vertical driving unit positioned at an edge of the horizontal driving unit to vertically drive relative to an optical axis of the OIS lens unit and the horizontal direction respectively, and a support unit positioned at a periphery of the vertical driving unit; an angular velocity detection unit detecting an angular velocity corresponding to a warpage of an optical path of the OIS lens unit; and an OIS driving unit transmitting a driving signal to the OIS actuator in response to the detected angular velocity, wherein the horizontal driving unit includes: a first combteeth-shaped first electrode at one side and a first elastic unit at the other side, and driven to a horizontal direction perpendicular to an optical axis of the OIS lens unit based on electrostatic force acting on the first electrode and elasticity force acting on the first elastic unit; a vertical driving unit having a second electrode discretely meshed with the first combteeth-shaped first electrode, a second combteeth-shaped third electrode at one side perpendicular to the optical axis and the horizontal direction and a second elastic unit on the other side, and driven to a horizontal direction based on electrostatic force acting on the third electrode and elasticity force acting on the second elastic unit; and a support unit having a fourth electrode discretely meshed with the second combteeth-shaped third electrode.

9. The camera module of claim 8, wherein the image sensor is a CCD (Charge Coupled Device) sensor or a CMOS (Complementary Metal Oxide Semiconductor) sensor.

10. The camera module of claim 8, wherein the angular velocity detecting unit is a gyro sensor.

11. The camera module of claim 8, wherein the first and second elastic units are bias springs respectively.

12. The camera module of claim 8, wherein the first elastic unit is supportively connected to the vertical driving unit.

13. The camera module of claim 8, wherein the second elastic unit is supportively connected to the support unit.

14. The camera module of claim 8, wherein the support unit further includes at least one terminal unit electrically connected to the first, second, third and fourth electrodes.

15. The camera module of claim 14, wherein the OIS driving unit is connected to the terminal unit.

16. The camera module of claim 8, wherein the OIS lens unit includes at least one lens.

17. The camera module of claim 8, wherein the camera module is further comprising an auto-focusing actuator positioned at a front surface or a back surface of the OIS actuator for being driven for automatic focus adjustment.

18. The camera module of claim 17, further comprising a focus adjusting driving unit for transmitting a driving signal to the auto-focusing actuator for adjusting a focal length from the image sensor.

19. The camera module of claim 17, wherein the auto-focusing actuator includes a capacitive type MEMS (Micro Electro Mechanical System) actuator for miniaturizing the camera module.

20. The camera module of claim 8, further comprising a sub lens barrel embedded with at least one lens between the image sensor and the OIS actuator.

* * * * *